United States Patent
Kim

(10) Patent No.: US 12,056,070 B2
(45) Date of Patent: Aug. 6, 2024

(54) TRANSMITTER DEVICE, RECEIVER DEVICE, TRANSMITTING METHOD, AND RECEIVING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Taewon Kim, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/939,612

(22) Filed: Sep. 7, 2022

(65) Prior Publication Data

US 2023/0305975 A1    Sep. 28, 2023

(30) Foreign Application Priority Data

Mar. 23, 2022 (JP) ................................. 2022-046699

(51) Int. Cl.
| | |
|---|---|
| G06F 13/20 | (2006.01) |
| G06F 13/38 | (2006.01) |
| G06F 13/42 | (2006.01) |
| H04L 1/00 | (2006.01) |
| H04L 67/12 | (2022.01) |
| H04L 69/06 | (2022.01) |

(52) U.S. Cl.
CPC .......... *G06F 13/20* (2013.01); *G06F 2213/40* (2013.01)

(58) Field of Classification Search
CPC .......................... H04L 67/30; H04W 36/0061
See application file for complete search history.

(56) References Cited

U.S. PATENT DOCUMENTS

| | | | |
|---|---|---|---|
| 2014/0136861 A1* | 5/2014 | Kim ...................... | G06F 1/3206 713/300 |
| 2015/0229514 A1* | 8/2015 | Okuyama ............... | H04L 67/30 709/214 |
| 2016/0183138 A1* | 6/2016 | Murakami ........ | H04W 36/0061 370/332 |
| 2018/0076925 A1* | 3/2018 | Neal ..................... | H04L 1/0041 |
| 2018/0329837 A1 | 11/2018 | Mishra et al. | |
| 2019/0305984 A1 | 10/2019 | Nakagawa et al. | |
| 2019/0319729 A1* | 10/2019 | Leong ................. | G06F 11/1679 |
| 2019/0387092 A1* | 12/2019 | Tessier .............. | H04M 1/72409 |
| 2020/0034354 A1 | 1/2020 | Horita et al. | |

FOREIGN PATENT DOCUMENTS

| | | |
|---|---|---|
| CN | 112579495 A | 3/2021 |
| JP | H04-095429 A | 3/1992 |
| JP | 2008-103996 A | 5/2008 |
| JP | 6652477 B2 | 2/2020 |
| JP | 2021-040171 A | 3/2021 |
| JP | 2021-105292 A | 7/2021 |

\* cited by examiner

*Primary Examiner* — Getente A Yimer
(74) *Attorney, Agent, or Firm* — Kim & Stewart LLP

(57) ABSTRACT

According to one embodiment, a transmitter device is configured to transmit to a receiver device including input and output terminals first setting data specifying input and output functions of the input and output terminals. The first setting data comprises first data common to the input and output terminals and second data inherent to each of the input and output terminals.

10 Claims, 24 Drawing Sheets

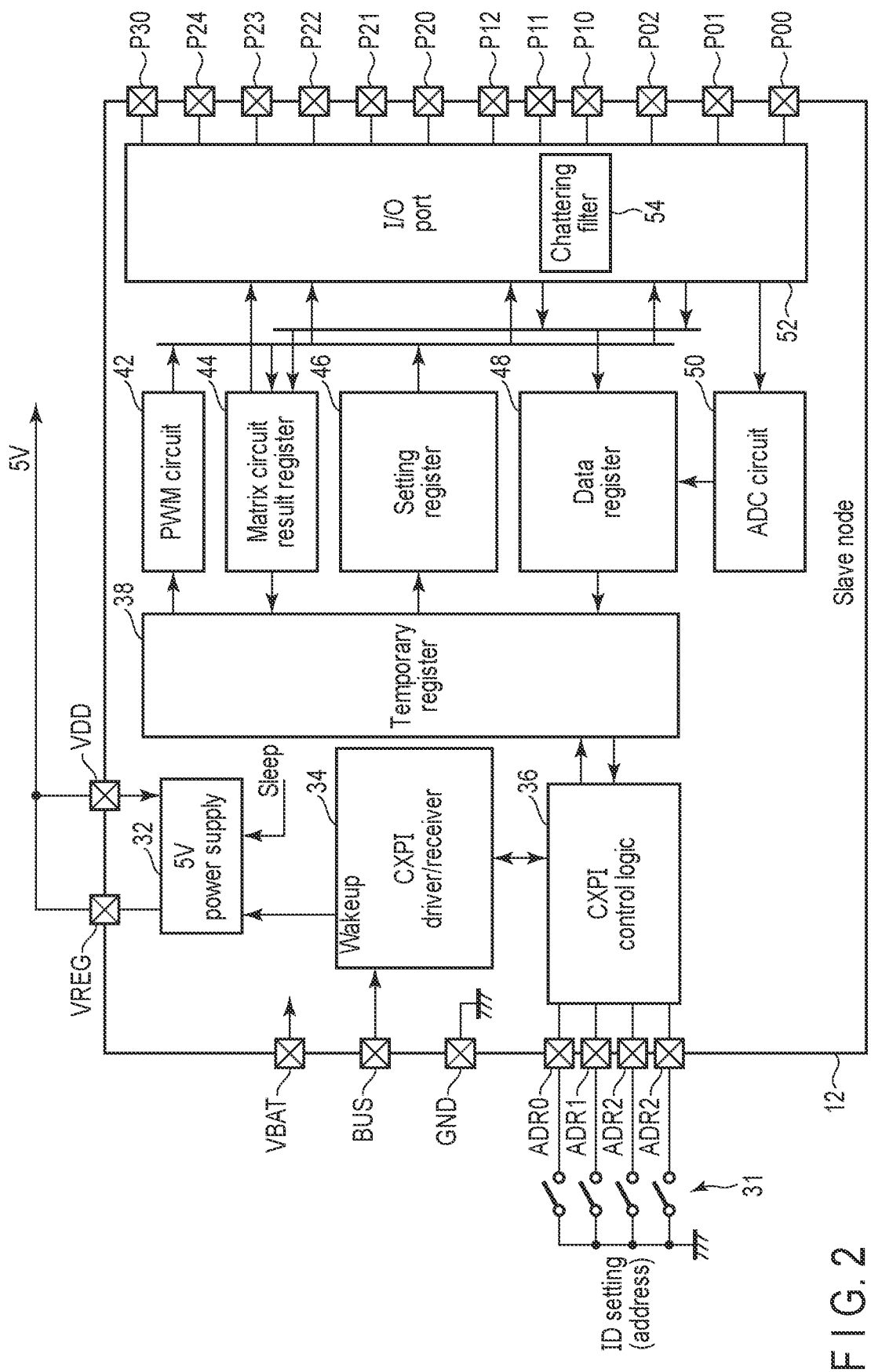
F I G. 2

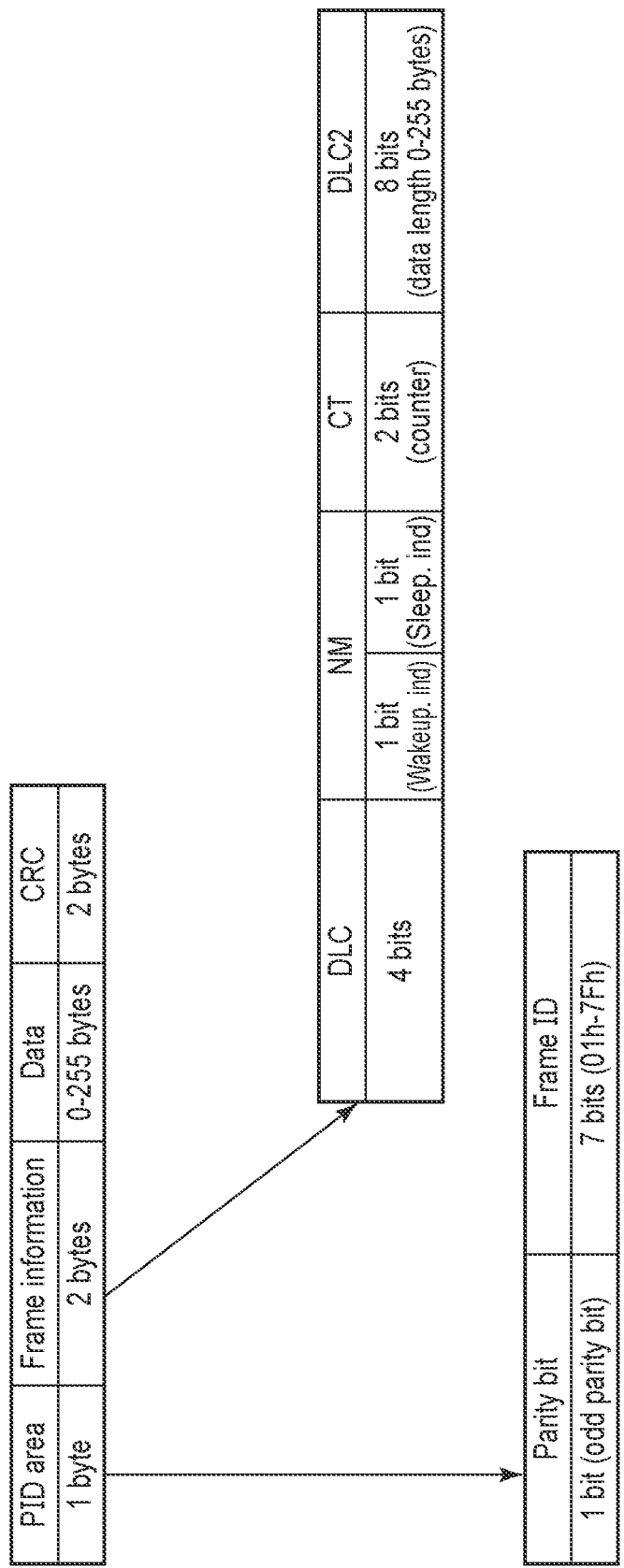
F I G. 4

| Order of transmission/reception | Frame ID (hexadecimal number) | CT (binary number) |
|---|---|---|
| 1 | 01h | 00b |
| 2 | 01h | 01b |
| 3 | 01h | 10b |
| 4 | 02h | 00b |
| 5 | 01h | 11b |
| 6 | 01h | 00b |
| 7 | 02h | 01b |
| 8 | 02h | 10b |

FIG. 5

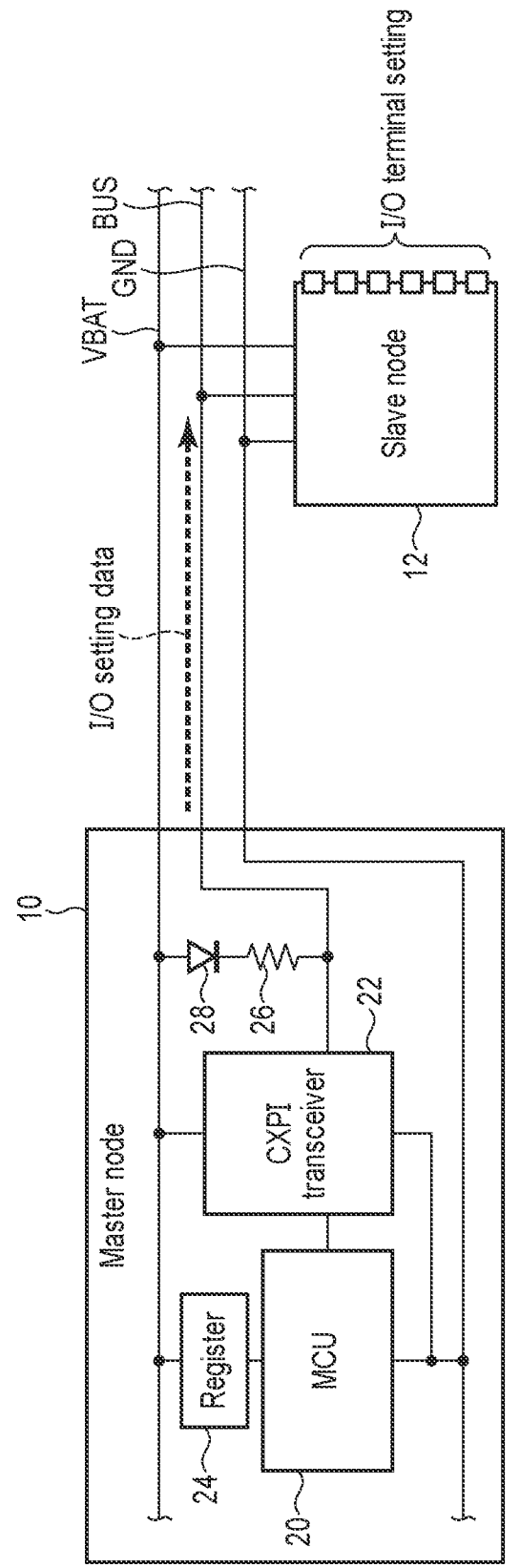
F I G. 6

| No. | Title | Details | Bit assignment | Number of bits | Number of Bytes |
|---|---|---|---|---|---|
| 1 | Filter time | Chattering time of chattering filter<br>Setting range (8 bits) | 8 bits × 6 patterns | 48 | 6 |
| 2 | Conducting time | On/off time of conduction<br>On setting (8 bits)<br>Off setting (8 bits) | 16 bits × 6 patterns | 96 | 12 |
| 3 | Wakeup monitoring time | Wakeup monitoring interval time during sleep<br>Setting range (8 bits) | 8 bits × 6 patterns | 48 | 6 |
| 4 | Fade-in application time | Fade-in time<br>Setting range (8 bits) | 8 bits × 8 patterns | 64 | 8 |
| 5 | Fade-out application time | Fade-out time<br>Setting range (8 bits) | 8 bits × 8 patterns | 64 | 8 |
| 6 | PWM resolution setting | Selected from 8, 10, and 12 bits | 2 bits | 2 | 0.25 |
| 7 | ADC resolution setting | Selected from 8, 10, and 12 bits | 2 bits | 2 | 0.25 |
| 8 | Dummy | Unused bits (to form 1-byte data) | 4 bits | 4 | 0.5 |

F I G. 7A

| No. | Title | Details | Bit assignment | Number of bits | Number of Bytes |
|---|---|---|---|---|---|
| 9 | Terminal P00: I/O setting | Din, Dout, PWM, and ADC (4 terminals) | 2 bits × 1 terminal | 2 | 0.25 |
| 10 | Filter setting | Chattering filter patterns (6 patterns in total) | 3 bits × 1 terminal | 3 | 0.375 |
| 11 | Wakeup monitoring time | Possibility of wakeup monitoring (6 patterns in total) | 3 bits × 1 terminal | 3 | 0.375 |
| 12 | PWM setting | PWM frequency setting (15 patterns in total) | 4 bits × 1 terminal | 4 | 0.5 |
| 13 | Pull up/down setting | Used as pull-up terminal or pull-down terminal | 2 bits × 1 terminal | 2 | 0.25 |
| 14 | Communication interruption operation | Operation at CXPI communication interruption | 2 bits × 1 terminal | 2 | 0.25 |

F I G. 7B

| No. | Title | Details | Bit assignment | Number of bits | Number of Bytes |
|---|---|---|---|---|---|
| 15 | Terminal P01: I/O setting | Din, Dout, PWM, and ADC (4 terminals) | 2 bits × 1 terminal | 2 | 0.25 |
| 16 | Filter setting | Chattering filter patterns (6 patterns in total) | 3 bits × 1 terminal | 3 | 0.375 |
| 17 | Wakeup monitoring time | Possibility of wakeup monitoring (6 patterns in total) | 3 bits × 1 terminal | 3 | 0.375 |
| 18 | PWM setting | PWM frequency setting (15 patterns in total) | 4 bits × 1 terminal | 4 | 0.5 |
| 19 | Pull up/down setting | Used as pull-up terminal or pull-down terminal | 2 bits × 1 terminal | 2 | 0.25 |
| 20 | Communication interruption operation | Operation at CXPI communication interruption | 2 bits × 1 terminal | 2 | 0.25 |

F I G. 8A

| No. | Title | Details | Bit assignment | Number of bits | Number of Bytes |
|---|---|---|---|---|---|
| 21 | Terminal P02: I/O setting | Din, Dout, PWM, and ADC (4 terminals) | 2 bits × 1 terminal | 2 | 0.25 |
| 22 | Filter setting | Chattering filter patterns (6 patterns in total) | 3 bits × 1 terminal | 3 | 0.375 |
| 23 | Wakeup monitoring time | Possibility of wakeup monitoring (6 patterns in total) | 3 bits × 1 terminal | 3 | 0.375 |
| 24 | PWM setting | PWM frequency setting (15 patterns in total) | 4 bits × 1 terminal | 4 | 0.5 |
| 25 | Pull up/down setting | Used as pull-up terminal or pull-down terminal | 2 bits × 1 terminal | 2 | 0.25 |
| 26 | Communication interruption operation | Operation at CXPI communication interruption | 2 bits × 1 terminal | 2 | 0.25 |
| ⋮ | ⋮ | ⋮ | ⋮ | ⋮ | ⋮ |

F I G. 8B

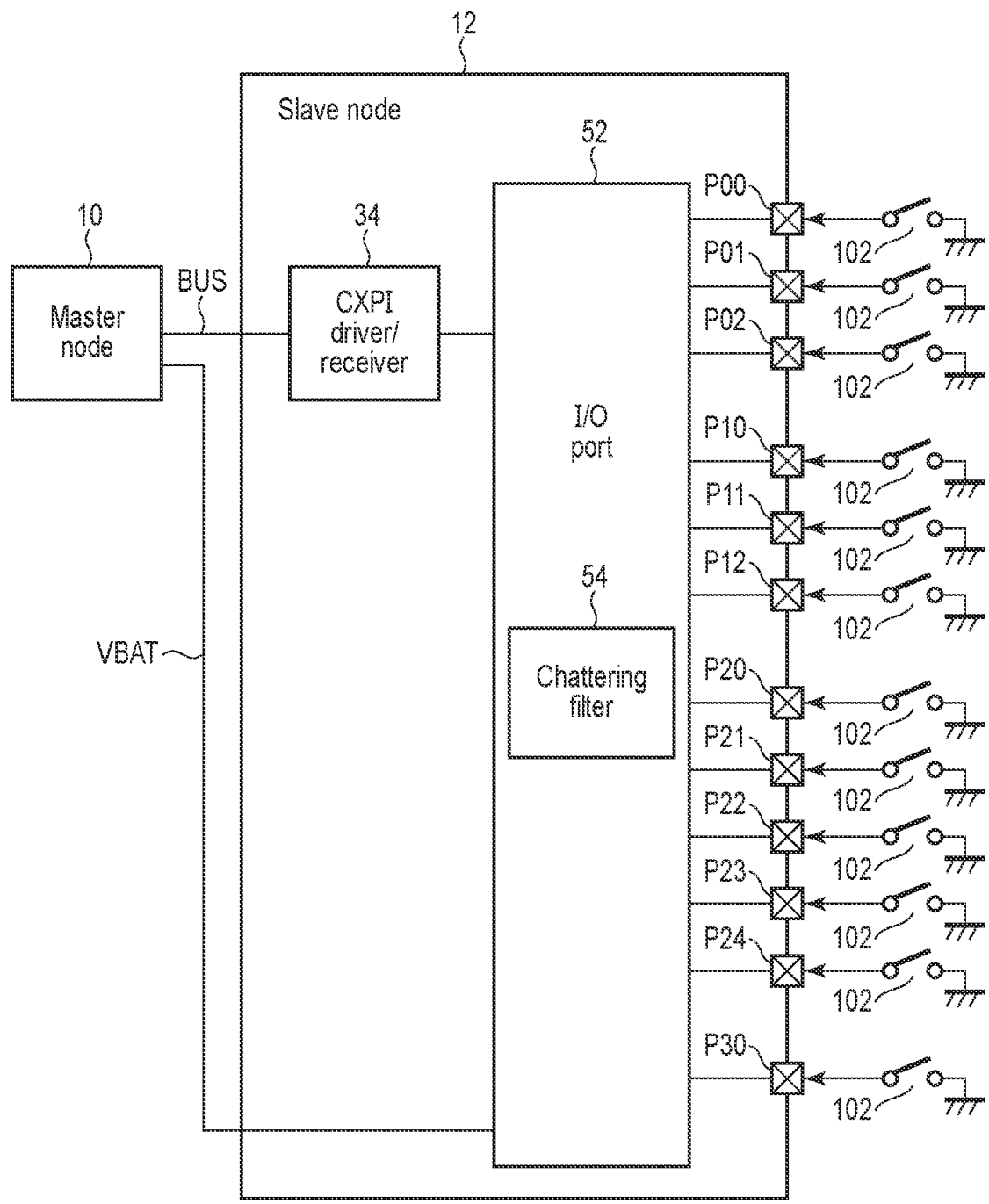
F I G. 9

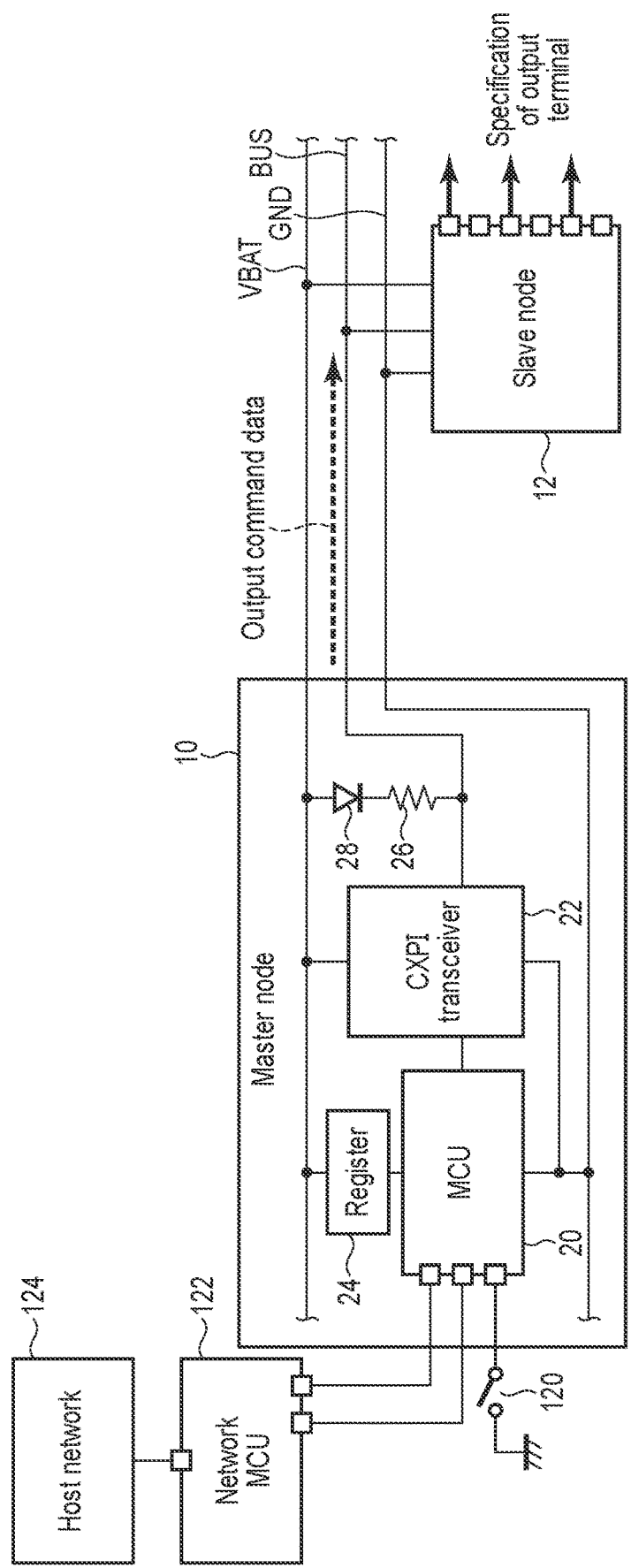
F I G. 13

| No. | Title | Details | Bit assignment | Number of bits | Number of Bytes |
|---|---|---|---|---|---|
| 1 | Communication error flag | Communication error of data which master node last receives (8 patterns in total) | 4 bits | 4 | 0.5 |
| 2 | Abnormal state clear request | Clear abnormal state flag Slave node returns to normal operation by this request | 1 bit | 1 | 0.125 |
| 3 | Dummy | Unused bits (to form 1-byte data) | 3 bits | 3 | 0.375 |
| 4 | Terminal P00: Output possibility | On/off of data output (On: permitting output from Dout or PWM) | 1 bit | 1 | 0.125 |
| 5 | Terminal P00: Conducting time output | Possibility of conducting time and conducting time patterns (6 patterns in total) | 3 bits | 3 | 0.375 |
| 6 | Terminal P00: Number of conducting time output | Number of conducting time output Setting range (4 bits) | 4 bits | 4 | 0.5 |

F I G. 14A

| No. | Title | Details | Bit assignment | Number of bits | Number of Bytes |
|---|---|---|---|---|---|
| 7 | Terminal P00: Fade-in pattern setting | One of patterns (8 patterns in total) of the fade-in time Valid when terminal P00 is set to PWM output terminal | 4 bits | 4 | 0.5 |
| 8 | Terminal P00: Fade-out pattern setting | One of patterns (8 patterns in total) of the fade-out time Valid when terminal P00 is set to PWM output terminal | 4 bits | 4 | 0.5 |
| 9 | Terminal P00: PWM duty additional bit 1 | Resolution of the PWM output (higher-order 2 bits in case of 12 bits) | 2 bits | 2 | 0.25 |
| 10 | Terminal P00: PWM duty additional bit 2 | Resolution of the PWM output (higher-order 2 bits in case of 10 bits) | 2 bits | 2 | 0.25 |
| 11 | Terminal P00: Dummy | Unused bits (to form 1-byte data) | 4 bits | 4 | 0.5 |
| 12 | Terminal P00: PWM duty | Duty of PWM output (8 bits) | 8 bits | 8 | 1 |

F I G. 14B

| No. | Title | Details | Bit assignment | Number of bits | Number of Bytes |
|---|---|---|---|---|---|
| 13 | Terminal P01: Output possibility | On/off of data output (On: permitting output from Dout or PWM) | 1 bit | 1 | 0.125 |
| 14 | Terminal P01: Conducting time output pattern | Possibility of conducting time and conducting time patterns (6 patterns in total) | 3 bits | 3 | 0.375 |
| 15 | Terminal P01: Number of conducting time output | Number of conducting time output Setting range (4 bits) | 4 bits | 4 | 0.5 |
| 16 | Terminal P01: Fade-in pattern setting | One of patterns (8 patterns in total) of the fade-in time Valid when terminal P01 is set to PWM output terminal | 4 bits | 4 | 0.5 |

F I G. 15A

| No. | Title | Details | Bit assignment | Number of bits | Number of Bytes |
|---|---|---|---|---|---|
| 17 | Terminal P01: Fade-out pattern setting | One of patterns (8 patterns in total) of the fade-out time Valid when terminal P01 is set to PWM | 4 bits | 4 | 0.5 |
| 18 | Terminal P01: PWM duty additional bit 1 | Resolution of the PWM output (higher-order 2 bits in case of 12 bits) | 2 bits | 2 | 0.25 |
| 19 | Terminal P01: PWM duty additional bit 2 | Resolution of the PWM output (higher-order 2 bits in case of 10 bits) | 2 bits | 2 | 0.25 |
| 20 | Terminal P01: Dummy | Unused bits (to form 1-byte data) | 4 bits | 4 | 0.5 |
| 21 | Terminal P01: PWM duty | Duty of PWM output (8 bits) | 8 bits | 8 | 1 |
| ... | ... | ... | ... | ... | ... |

F I G. 15B

| No. | Title | Details | Bit assignment | Number of bits | Number of Bytes |
|---|---|---|---|---|---|
| 1 | Communication error flag | Communication error of data which slave node last receives (9 patterns in total) | 4 bits | 4 | 0.5 |
| 2 | Abnormal state clear request | Indicative of abnormal state | 2 bits | 2 | 0.25 |
| 3 | Dummy | Unused bits (to form 1-byte data) | 2 bits | 2 | 0.25 |
| 4 | Terminal P00: Input possibility | On/off of data input (On: permitting input from Din) | 1 bit | 1 | 0.125 |
| 5 | Terminal P00: ADC input additional bit 1 | A value input from ADC (higher-order 2 bits in a case where the resolution of ADC is 12 bits) | 2 bits | 2 | 0.25 |
| 6 | Terminal P00: ADC input additional bit 2 | A value input from ADC (higher-order 2 bits in a case where the resolution of ADC is 10 bits) | 2 bits | 2 | 0.25 |
| 7 | Terminal P00: Dummy | Unused bits (to form 1-byte data) | 3 bits | 3 | 0.375 |

F I G. 17A

| No. | Title | Details | Bit assignment | Number of bits | Number of Bytes |
|---|---|---|---|---|---|
| 8 | Terminal P00: ADC input | A value input from ADC (8 bits) | 8 bits | 8 | 1 |
| 9 | Terminal P01: Input possibility | On/off of data input (On: permitting input from Din) | 1 bit | 1 | 0.125 |
| 10 | Terminal P01: ADC input additional bit 1 | A value input from ADC (higher-order 2 bits in a case where the resolution of ADC is 12 bits) | 2 bits | 2 | 0.25 |
| 11 | Terminal P01: ADC input additional bit 2 | A value input from ADC (higher-order 2 bits in a case where the resolution of ADC is 10 bits) | 2 bits | 2 | 0.25 |
| 12 | Terminal P01: Dummy | Unused bits (to form 1-byte data) | 3 bits | 3 | 0.375 |
| 13 | Terminal P01: ADC input | A value input from ADC (8 bits) | 8 bits | 8 | 1 |
| ... | ... | ... | ... | ... | ... |

F I G. 17B

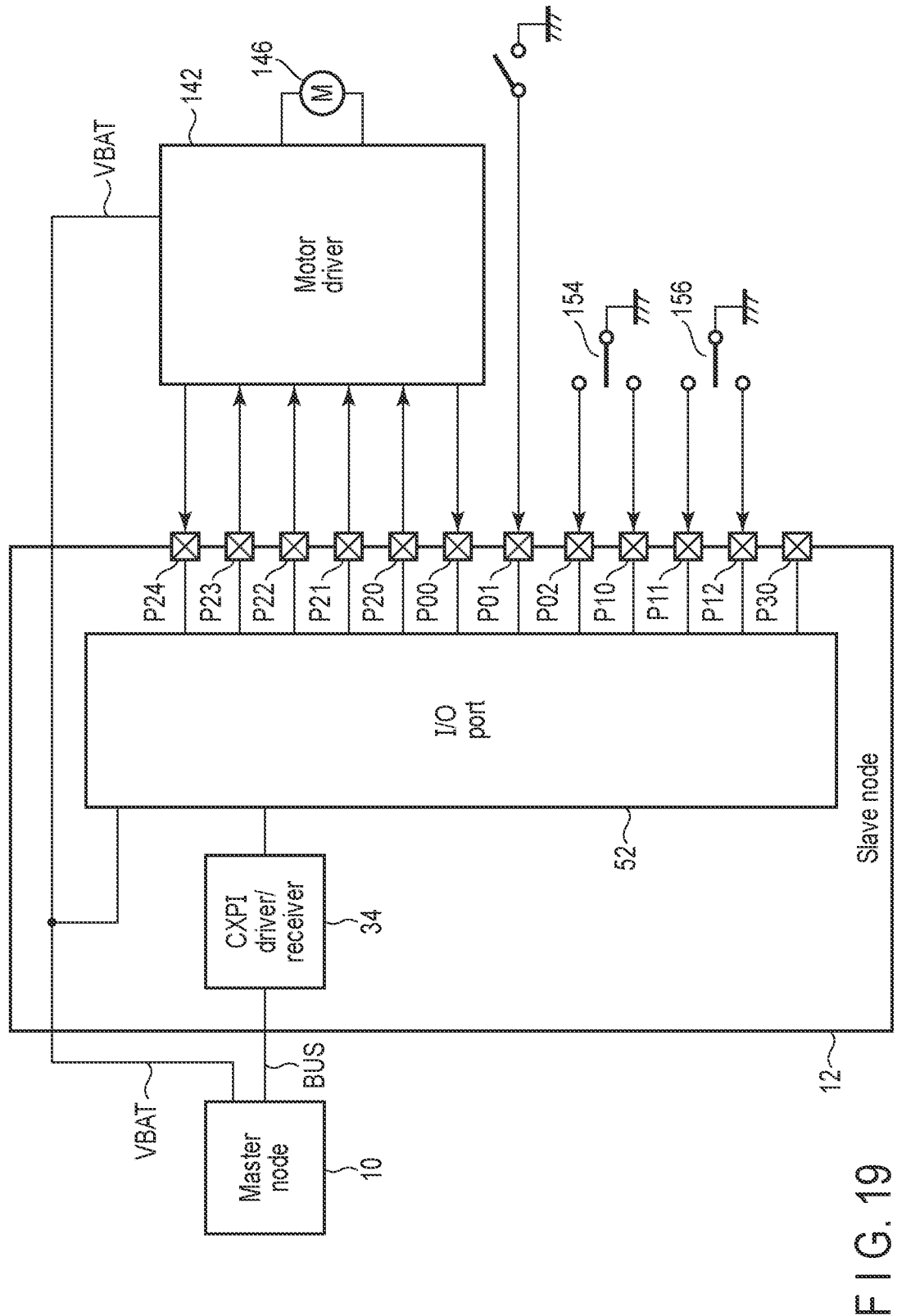
F I G. 19

TRANSMITTER DEVICE, RECEIVER DEVICE, TRANSMITTING METHOD, AND RECEIVING METHOD

CROSS-REFERENCE TO RELATED APPLICATIONS

This application is based upon and claims the benefit of priority from Japanese Patent Application No. 2022-046699, filed Mar. 23, 2022, the entire contents of which are incorporated herein by reference.

FIELD

Embodiments described herein relate generally to large-capacity data communication.

BACKGROUND

Society of Automotive Engineers of Japan, Inc., has defined an automotive communication protocol standard referred to as Clock Extension Peripheral Interface (CXPI). CXPI aims to reduce the number of wiring harnesses and multiplexed communications between automotive devices subjected to one-to-one connection, which have increased in the human machine interface (HMI) domain. In CXPI, bidirectional communication between a master node and slave nodes has been defined.

The slave node includes a large number of I/O terminals connected to a large number of devices, respectively. The input/output function of each I/O terminal of the slave node includes various setting items, which need to be set. The master node transmits setting data of the I/O terminal to the slave node. Since the setting data includes data for each terminal, the size of the setting data is large.

BRIEF DESCRIPTION OF THE DRAWINGS

FIG. 2 is a block diagram showing an example of a slave node according to the embodiment.

FIG. 4 shows an example of a format of a burst frame communicated on the signal line according to the embodiment.

FIG. 5 shows an example of use of CT according to the embodiment.

FIG. 6 is a block diagram showing an example of communication according to the embodiment.

FIG. 7A shows an example of I/O setting data according to the embodiment.

FIG. 7B shows an example of I/O setting data according to the embodiment.

FIG. 8A shows an example of I/O setting data according to the embodiment.

FIG. 8B shows an example of I/O setting data according to the embodiment.

FIG. 9 is a block diagram showing another example of the slave node according to the embodiment.

FIG. 13 is a block diagram showing an example of communication according to the embodiment.

FIG. 14A shows an example of output command data according to the embodiment.

FIG. 14B shows an example of output command data according to the embodiment.

FIG. 15A shows an example of output command data according to the embodiment.

FIG. 15B shows an example of output command data according to the embodiment.

FIG. 17A shows an example of input notification data according to the embodiment.

FIG. 17B shows an example of input notification data according to the embodiment.

FIG. 19 is a block diagram showing another example of the slave node according to the embodiment.

DETAILED DESCRIPTION

Figure 1:
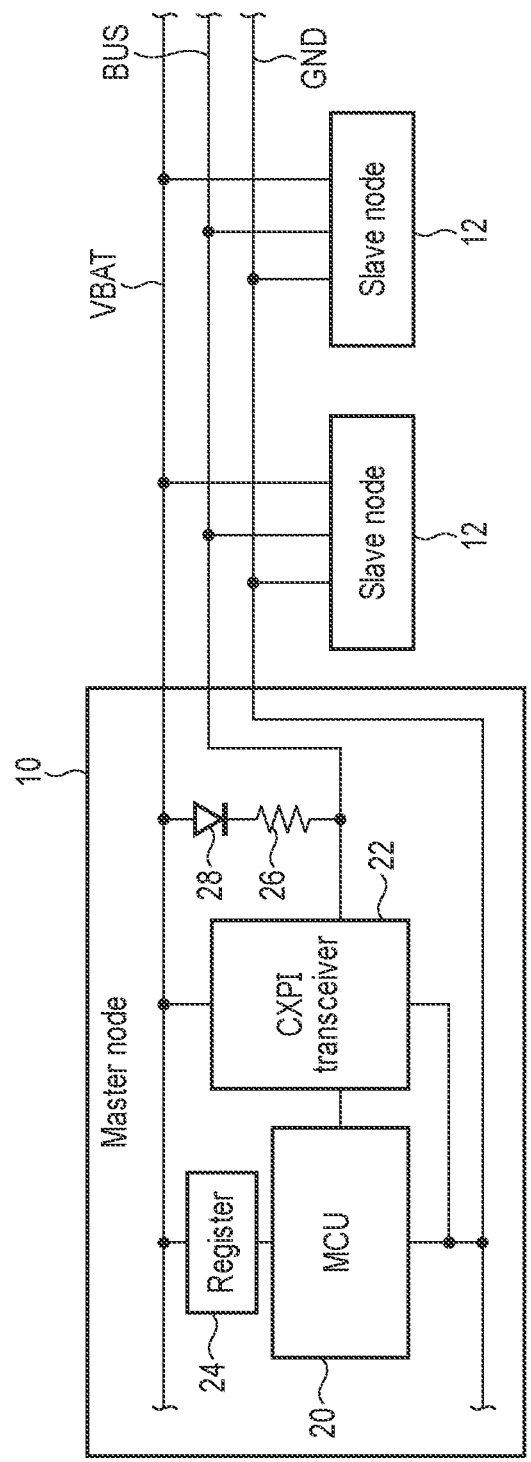
FIG. 1 is a block diagram showing an example of a communication system according to an embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a transmitter device is configured to transmit to a receiver device including input and output terminals first setting data specifying input and output functions of the input and output terminals. The first setting data comprises first data common to the input and output terminals and second data inherent to each of the input and output terminals.

FIG. 1 is a block diagram showing an example of a CXPI communication system according to an embodiment. The CXPI communication system includes slave nodes 12 each including terminals that are connected to devices, and a master node 10 that controls the slave nodes 12. Each node has a node address. The master node 10 includes terminals that are connected to devices. The master node 10 is also referred to as a body control module (BCM). The master node 10 and the slave nodes 12 are connected via a power line VBAT, a signal line BUS, and a ground line GND. Devices connected to the slave nodes 12 communicate with the master node 10 via the signal line BUS.

The master node 10 includes a microcontroller unit (MCU) 20, a CXPI transceiver 22, and a register 24. The MCU 20 controls the entire master node 10. The CXPI transceiver 22 modulates data from the MCU 20 and outputs the modulated data to the signal line BUS. An example of the modulation method is pulse width modulation (PWM). The CXPI transceiver 22 demodulates the data from the signal line BUS and outputs the demodulated data to the MCU 20. The MCU 20 stores the data in the register 24. The register 24 is, for example, a nonvolatile memory. The signal line BUS and the power line VBAT are connected to each other in the master node 10 via a resistor 26 and a diode 28 in series.

FIG. 2 is a block diagram showing an example of the slave node 12 according to the embodiment. The slave node 12 includes a 5V power supply 32, a CXPI driver/receiver 34, a CXPI control logic 36, a temporary register 38, a PWM circuit 42, a matrix circuit result register 44, a setting register 46, a data register 48, an analog-to-digital conversion (ADC) circuit 50, an I/O port 52, and a chattering filter 54.

The signal line BUS is connected to the CXPI driver/receiver 34. The CXPI driver/receiver 34 receives a signal from the master node 10, and transmits a signal to the master node 10. The CXPI driver/receiver 34 activates the 5V power supply 32 when instructed to wake up by the master node 10 via the signal line BUS. The 5V power supply 32 supplies a power source voltage to each unit of the slave node 12 with a voltage from the power supply line BVAT. The 5V power supply 32 stops operation when receiving a sleep signal generated inside the slave node 12.

The slave node 12 can set a node address (for example, 4 bits). The slave node 12 includes node address terminals that are connected to four switches 31 on the substrate, respectively. Node addresses AD0, AD1, AD2, and AD3 in which "0" or "1" is set according to the conduction/opening of the switches 31 are set to the CXPI control logic 36.

A plurality of, for example, twelve I/O terminals P00, P01, P02, P10, P11, P12, P20, P21, P22, P23, P24, and P30 are connected to the I/O port 52. Each of the chattering filters 54 is connected to each of the I/O terminals P00 to P30 to prevent chattering of input signals. The chattering prevention effect is variable according to the chattering time.

The PWM circuit 42 executes pulse width modulation of the pulse output from any of the I/O terminals P00 to P30. The resolution, the frequency, and the duty of the PWM signal may be different for each slave node. The resolution is the number of bits of data represented by the PWM signal and is set to, for example, any of 8 bits, 10 bits, and 12 bits. The frequency is set to any of, for example, fifteen frequencies. The duty is set to, for example, 10%, 25%, or the like.

Figure 3:
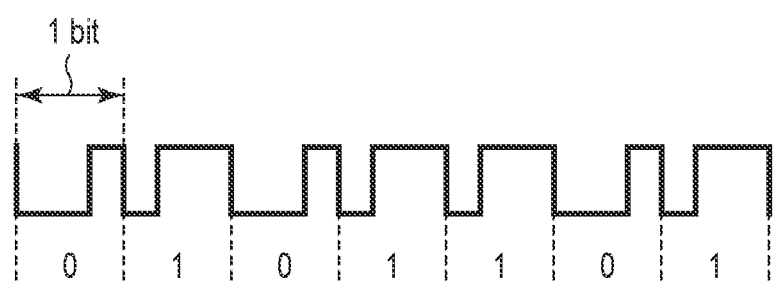
FIG. 3 shows an example of a signal waveform on a signal line according to the embodiment.

FIG. 3 shows an example of a signal waveform on the signal line BUS according to the embodiment. Each bit of data represents "0" or "1" according to the ratio of a low level period to a high level period.

When a matrix circuit including m×n switches is connected to the I/O terminals P00 to P30, the matrix circuit result register 44 stores a detection result that is the detection position of the switch detecting the conduction. The setting register 46 stores set values of setting items of input/output functions, set values of output specifications when outputting signals from the output terminals, and set values of input specifications when inputting signals to the input terminals, for the I/O terminals P00 to P30. The data register 48 stores input and output data of the I/O terminals P00 to P30. A nonvolatile memory may be provided instead of or in addition to the setting register 46, and the set values of the setting items of the I/O terminals, the set values of the output specifications, and the set values of the input specifications may be stored in the nonvolatile memory.

The ADC circuit 50 converts analog signals input from I/O terminals P00 to P30 into digital signals. The resolution of the ADC circuit 50 may be different for each slave node 12. The resolution of the ADC circuit 50 is set to any one of 8, 10, and 12 bits.

In the CXPI communication, event-trigger frames are communicated. Each node can freely transmit frames when detecting an idle status of the bus. When a plurality of transmission events occur simultaneously, an event for the frame with higher priority is selected by arbitration.

FIG. 4 shows an example of a format of a burst frame communicated on the signal line BUS according to the embodiment. The communication frame includes a protected ID (PID) area and a response area.

The PID area includes 1-bit parity bit and a 7-bit frame ID. The parity bit is, for example, an odd parity bit. The frame ID is 01h to 7Fh. The priority is set for the frame in advance, and arbitration is performed based on the priority.

The PID is an identifier that identifies the CXPI frame transmitted or received at each node. The master node 10 sets the PID for CXPI frame used between the master node 10 and the slave nodes 12. A plurality of PIDs can be set for data transmission, data reception, data request, data response, and the like, in each slave node. The slave node 12 specified in the PID area can receive the communication frame and transmit the response area. The one-to-one communication is thereby executed.

The response area includes frame information (2 bytes), data (0-255 (maximum) bytes), and CRC (2 bytes). The frame information includes a 4-bit DLC, a 2-bit NM, a 2-bit CT, and an 8-bit DLC2. The DLC is information that specifies the burst frame (4 bits=1111). The response area of the communication frames other than the burst frame includes frame information (1 byte), data (0-12 (maximum) bytes), and CRC (1 byte). The frame information includes a 4-bit DLC, a 2-bit NM, and a 2-bit CT and does not include the DLC2. The DLC is indicative of the data length (12 bytes at maximum) of the data in the communication frame by byte unit. The length of the frame is also varied in accordance with the value of the DLC.

NM includes 1-bit Wakeup.ind and 1-bit Sleep.ind, which are used for sleep/wakeup processing.

The master node 10 continues setting "1b" at Wakeup.ind until slept when transmitting a clock with the own node serving as a trigger at wakeup. The slave node 12 continues setting "1b" at Wakeup.ind until slept when transmitting a wakeup pulse at wakeup. In the other cases, "0b" is set at Wakeup.ind.

Each node indicates whether sleep is currently allowed or not by Sleep.ind. Each node sets "0b" at Sleep.ind in a sleep prohibit status, and sets "1b" at Sleep.ind in a sleep permit state.

CT is a counter value that indicates the continuity (sequence information) of frames. Whether the CT is used or not can be selected for each system. The CT is incremented in units of frame ID at transmission of the response area. The initial value of the CT is "00b". The CT returns to "00b" after "11b". When a shift in the CT is found on the receiving side, it is determined that there is no continuity of frames. A transmitting node increments and transmits the CT of the next frame to be transmitted even if the transmitted frame is an error.

Both transmitting and receiving nodes return the CT to its initial value at power-on and wakeup. FIG. 5 shows an example of use of the CT according to the embodiment. It is assumed that frames corresponding to the frame ID columns are transmitted in order from 1 to 8 and transmission and reception, and that the value of each CT column is stored in a CT part of the frame. Since the CT is managed for each frame ID, the CT is incremented by 1 every time a response area is returned for frame ID "01h" on the first through third transmissions and receptions. Since the frame ID is "02h" on the fourth transmission and reception, the CT for frame ID "02h" is incremented. When the frame ID "01h" is incremented on the fifth transmission and reception, the previous value of the CT of the response area is incremented and the CT becomes "11b".

In contrast, if the seventh frame cannot be received due to an error and the eighth frame is received, the CT is "10b" although the previous CT of frame ID "02h" is "00b", and it is determined that the order is not secured and the continuity of frames is broken.

The DLC2 indicates the data length (up to 256 bytes) of the data in the communication frame in units of bytes. The length of the frame changes according to the value of DLC2.

The CRC is an error detection area.

A general communication sequence between the master node 10 and the slave node 12 in the CXPI communication will be described. A vehicle includes a steering switch, a wiper switch, a light switch, a motor, lights, and the like, which are connected to the I/O port 52 of the slave node 12. The master node 10 can set using each I/O terminal of the slave node 12 as an input terminal or an output terminal, and can transmit the I/O setting data specifying various functions of the terminal to the slave nodes 12. In addition, the master node 10 can also transmit to the slave nodes 12 output command data specifying the specifications for outputting signals from the terminal set as an output terminal among the I/O terminals of the slave nodes 12. Furthermore, the slave nodes 12 can transmit to the master node 10 input notification data for notifying the terminal set as the input terminal among the I/O terminals of the input signal.

FIG. 6 is a block diagram showing an example of the communication in which the master node 10 transmits the I/O setting data to the slave nodes 12, according to the embodiment. When a battery is installed in a vehicle, power is applied to the CXPI communication system. When power is turned on, the master node 10 transmits a wakeup pulse to the slave nodes 12. When the slave nodes 12 receive the wakeup pulse, the CXPI driver/receiver 34 supplies the wakeup pulse to the 5V power supply 32 to activate the 5V power supply 32. After the activation of the 5V power supply 32, the slave nodes 12 enter the normal mode and notifies the master node 10 of the activation. The CXPI communication system remains powered on when an engine key of the vehicle is turned off.

When reception of the wakeup pulse of a slave node trigger from the slave node 12, the master node 10 enters a normal mode. When both the master node 10 and the slave nodes 12 enter the normal mode, the master node 10 transmits the I/O setting data to the slave nodes 12. The I/O setting data is also transmitted as the frame shown in FIG. 4. The setting data is described in the data area. The master node 10 describes the PID of the slave node 12 to be set, in the PID area.

The corresponding slave node 12 receives the I/O setting data, sets whether to use each I/O terminal as an input terminal or an output terminal according to the I/O setting data, and sets function items of the set terminal. The set values are stored in the setting register 46.

FIGS. 7A, 7B, 8A, and 8B show an example of the I/O setting data transmitted from the master node 10 to the slave nodes 12 according to the embodiment. The I/O setting data includes data common to all the I/O terminals and data inherent to each of the I/O terminals. The I/O setting data is stored in the setting register 46 of the slave node 12.

The data common to all the I/O terminals are eight data elements of data No. 1 through data No. 8. The data common to all I/O terminals indicate candidates (also referred to as patterns) of a plurality of set values that may be set in the functions of each of the terminals. The data inherent to each of the I/O terminals specifies identification information of the patterns set at the terminals.

Data No. 1 is filter time data indicating chattering time data of the chattering filter 54. The time data of one pattern is expressed by 1 byte. 6-byte data No. 1 indicates the time data of six patterns. When a terminal input occurs, the slave node 12 does not immediately respond to the terminal input but responds after the chattering time elapses. The chattering time is also referred to as a standby time.

Data No. 2 is conduction time data indicating the on/off time upon turning on and off the conduction of the device to be connected to the output terminal. The output terminal is not continuously conducted, but conduction and non-conduction are repeated. For example, the I/O terminal connected to the motor connected to the side view mirror repeats conduction of a first time and non-conduction of a second time and moves the mirror at each certain angle. The on data specifies the conduction time and the off data specifies the non-conduction time. Since one pattern of the on data is expressed by 1 byte and one of the off data is also referred to as 1 byte, one pattern of the on/off data is expressed by 2 bytes. 12-byte data No. 2 indicates the on/off data of the conduction time of six patterns.

Data No. 3 is wakeup monitoring time data indicating the wakeup monitoring interval time during sleep. The slave node 12 monitors periodically reception of the wakeup pulse during the sleep period. One pattern of the monitoring time data is expressed by 1 byte. 6-byte data No. 3 indicates the monitoring time data of six patterns.

Data No. 4 is fade-in application time data indicating a fade-in time. The LED is not instantaneously turned on and off, but turned on and off gradually over time. The fade-in time is the time to change turning off to turning on. A fade-out time is the time to change turning on to turning off. One pattern of the fade-in application time data is expressed by 1 byte. 8-byte data No. 4 indicates the application time data of eight patterns. The fade-in and fade-out are realized by changing the duty ratio of the PWM signal.

Data No. 5 is fade-out application time data indicating the fade-out time. One pattern of the fade-out application time data is expressed by 1 byte. 8-byte data No. 5 indicates the application time data of eight patterns.

Data No. 6 is a 2-bit (0.25-byte) PWM resolution setting data by which the resolution of the PWM signal is selected from 8 bits, 10 bits, and 12 bits.

Data No. 7 is a 2-bit (0.25 bytes) ADC resolution setting data by which the ADC circuit 50 specifies the resolution to any of 8 bits, 10 bits, and 12 bits when executing analog-to-digital conversion of the input signal.

Since the sum of data No. 6 and data No. 7 is 0.5 bytes (4 bits) and the data is communicated in 1-byte units, data No. 8 is set as dummy data that is unused bits of 4 bits (0.5 bytes).

Data inherent to each I/O terminal are 6 data elements. Data inherent to the I/O terminal P00 are data No. 9 through data No. 14.

Data No. 9 is 2-bit (0.25-byte) I/O setting data indicating that the I/O terminal P00 is used as any of four terminals, i.e., a digital input terminal (Din), a digital output terminal (Dout), an output terminal (PWM) that outputs an on signal of duty at 100%, and an analog input terminal (ADC).

Data No. 10 is 3-bit (0.375-byte) filter setting data specifying the chattering time patterns (6 patterns in total) of the chattering filter 54 that processes the input signal at the I/O terminal P00.

Data No. 11 is 3-bit (0.375-byte) wakeup monitoring setting data that specifies possibility of the wakeup monitoring of the I/O terminal P00 and the monitoring interval time (6 patterns in total) when the wakeup monitoring is enabled. The monitoring interval time pattern is set in the slave node 12 by data No. 3 at a common part of the I/O setting data and is stored in the setting register 46.

Data No. 12 is a 4-bit (0.5-byte) PWM frequency setting data that specifies PWM frequency (15 patterns in total) of the I/O terminal P00. The PWM frequency pattern is set in the slave node 12 by data No. 12 at the common part of the I/O setting data and is stored in the setting register 46.

Data No. 13 is 2-bit (0.25-byte) pull-up/pull-down setting data specifying using the I/O terminal P00 as a pull-up terminal or a pull-down terminal.

Data No. 14 is 2-bit (0.25-byte) communication interruption operation data that specifies the output operation of the I/O terminal P00 at the time of CXPI communication interruption. For example, when communication is interrupted, the data specifies continuing the output for a few seconds or stopping the output immediately.

Data inherent to the I/O terminal P01 are data No. 15 through to data No. 20. Data inherent to the I/O terminal P02 are data No. 21 through to data No. 26. The inherent data are also communicated for other I/O terminals.

Data No. 15 and data No. 21 are I/O setting data similar to data No. 9. Data No. 16 and data No. 22 are I/O setting data similar to data No. 10. Data No. 17 and data No. 23 are the wake-up monitoring setting data similar to the data No. 11. Data No. 18 and data No. 24 are the PWM setting data similar to data No. 12. Data No. 19 and data No. 25 are pull-up/pull-down setting data similar to data No. 13. Data No. 20 and data No. 26 are communication interruption operation data similar to data No. 14.

Thus, data No. 1 through No. 8 that are common to all the I/O terminals specify the representative patterns set for the respective I/O terminals, and the data inherent to the respective I/O terminals specify identifiers of the patterns set for the respective I/O terminals. Thus, even if the number of I/O terminals increases, increase in the data amount of the I/O setting data communicated from the master node 10 to the slave nodes 12 is suppressed and efficient data communication is realized. In addition, since the I/O setting data are classified into data common to all the I/O terminals and data inherent to each of the I/O terminals and the data inherent to each of the I/O terminals is transmitted only for the number of I/O terminals, the master node 10 can make a flexible response corresponding to the number of I/O terminals, which facilitates I/O settings for the slave nodes 12 with various numbers of terminals even if the slave nodes 12 with different numbers of terminals exist together in the communication system.

FIG. 9 is a block diagram showing another example of the slave node 12 where all the I/O terminals P00 to P30 are connected to on/off switches 102 according to the embodiment. Examples of switches 120 are steering switches, wiper switches, light switches, and the like. All the I/O terminals P00 to P30 are set as digital input terminals (Din).

Figure 10:
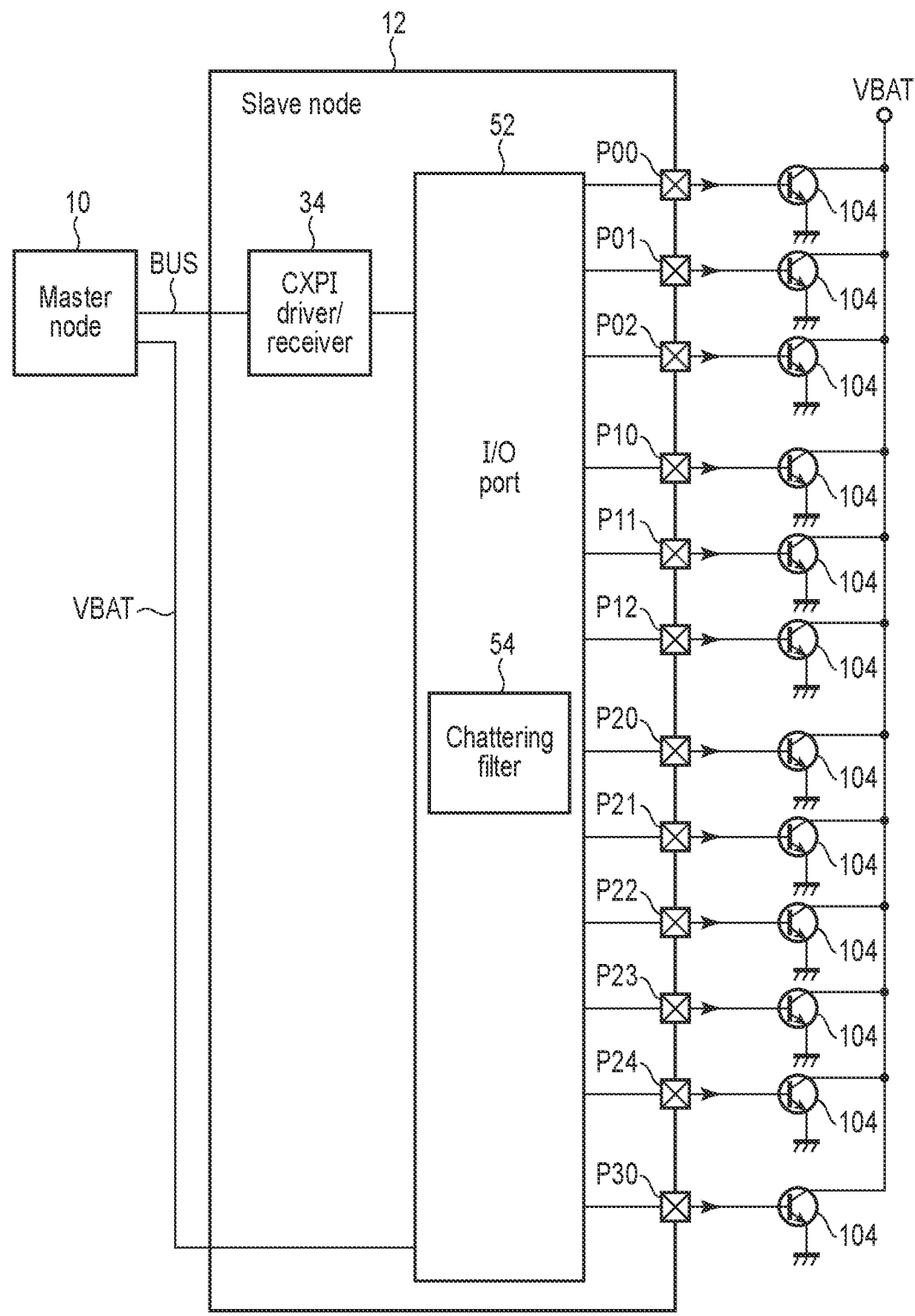
FIG. 10 is a block diagram showing another example of the slave node according to the embodiment.

FIG. 10 is a block diagram showing another example of the slave node 12 where all the I/O terminals P00 to P30 are connected to transistors 104 according to the embodiment. Examples of the transistors 104 are drivers that drives motors, lights, and the like. All the I/O terminals P00 to P30 are set as digital output terminals (Dout) or output terminals (PWM).

Figure 11:
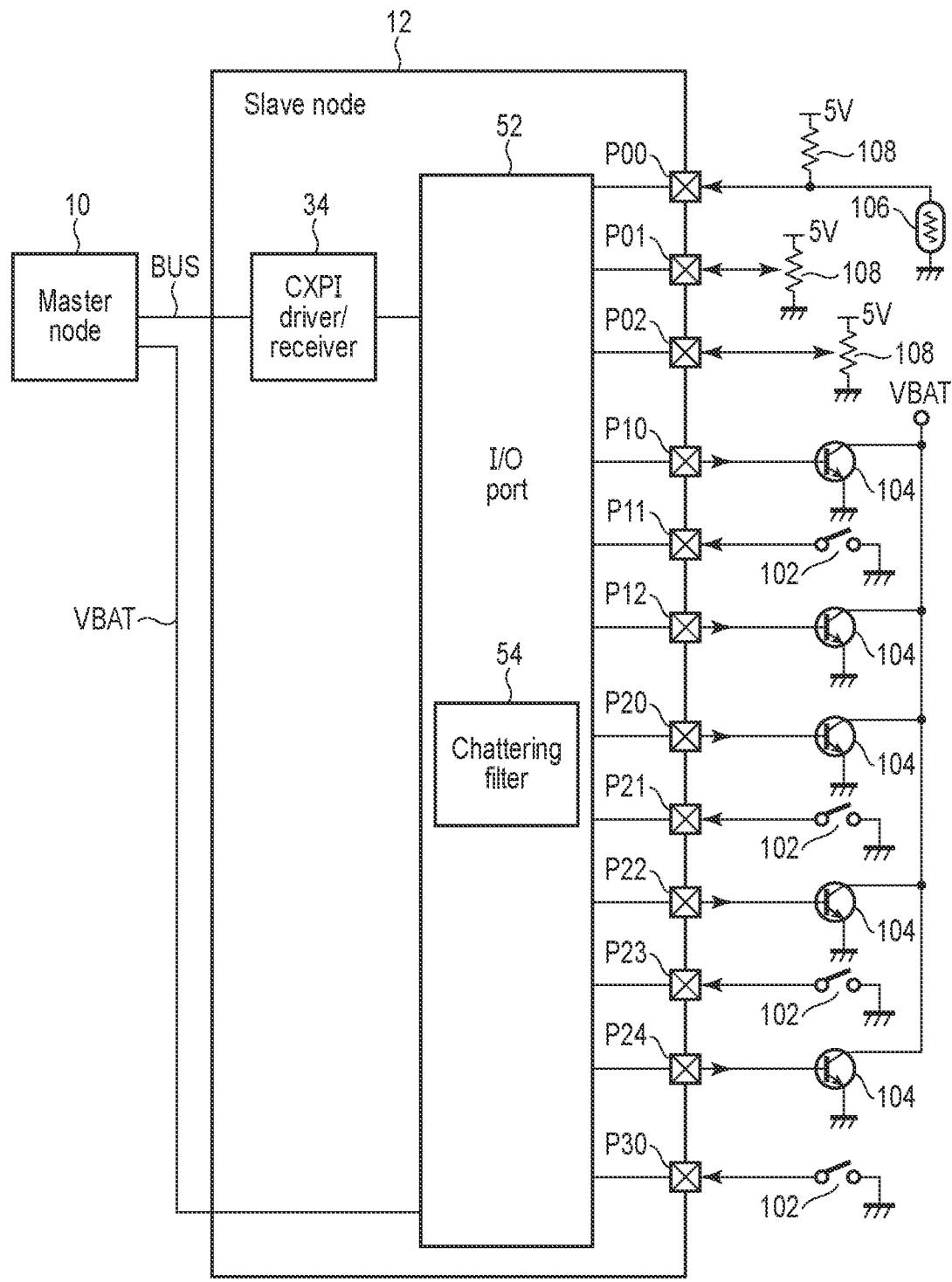
FIG. 11 is a block diagram showing another example of the slave node according to the embodiment.

FIG. 11 is a block diagram showing another example of the slave node 12 where the I/O terminal P00 is connected to a temperature sensor 106 and the I/O terminals P01 and P02 are connected to potentiometers 108, according to the embodiment. The I/O terminals P00, P01, and P02 are set as analog input terminals (ADC), the I/O terminals P11, P21, P23, and P30 are set as digital input terminals (Din), and the I/O terminals P10, P12, P20, P22, and P24 are set as digital output terminals (Dout).

Figure 12:
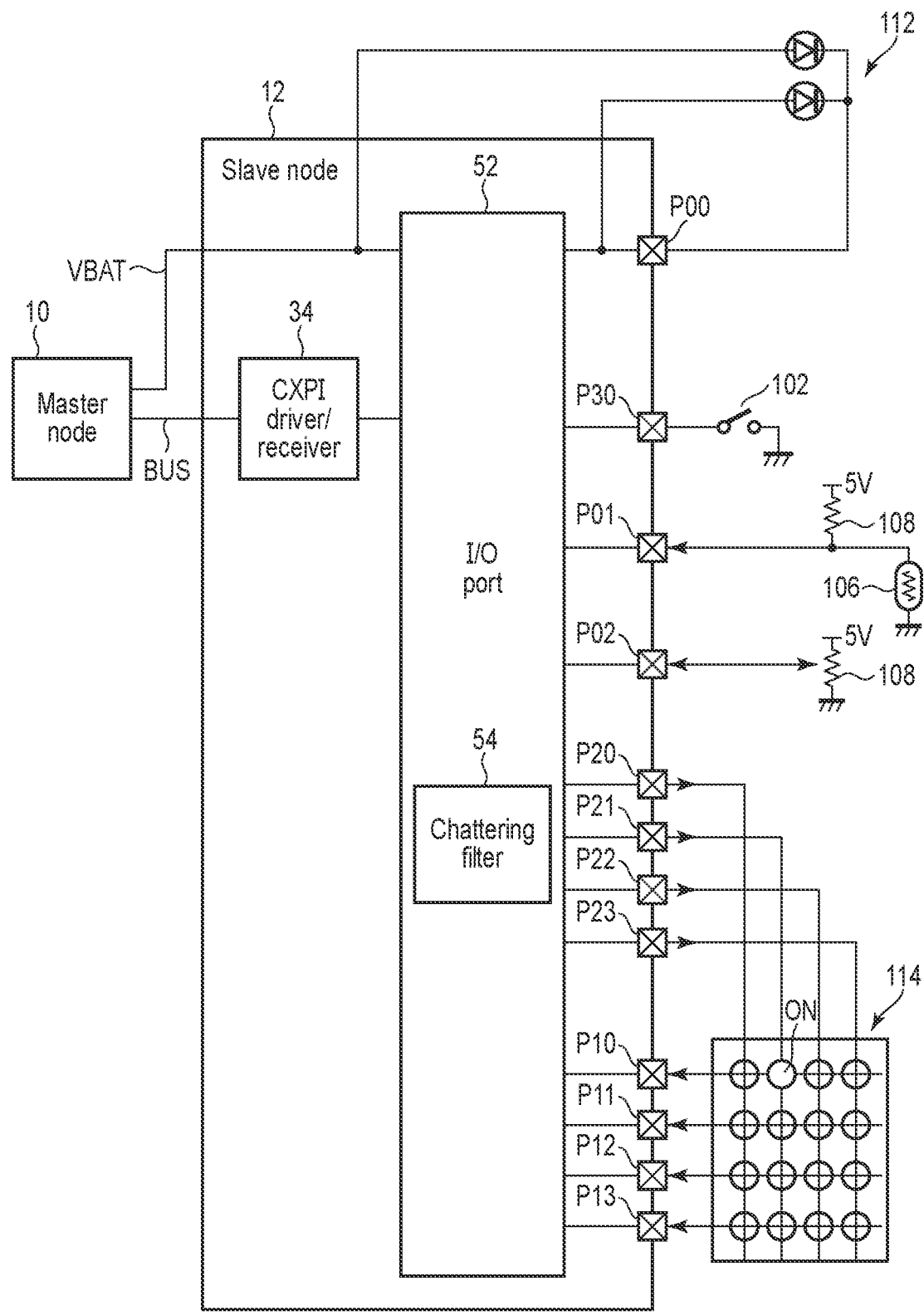
FIG. 12 is a block diagram showing another example of the slave node according to the embodiment.

FIG. 12 is a block diagram showing another example of the slave node 12 where the I/O terminal P00 is connected to a light 112, the I/O terminal P30 is connected to an on/off switch 102, the I/O terminal P01 is connected to a temperature sensor 106, the I/O terminal P02 is connected to a potentiometer 108, and the I/O terminals P20 to P23 and P10 to P13 are connected to a matrix circuit 114, according to the embodiment. The I/O terminals P00 and P20 to P23 (or P10 to P13) are set to digital output terminals (Dout), and the I/O terminals P30, and P10 to P13 (or P20 to P23) are set to the digital input terminals (Din).

FIG. 13 is a block diagram showing an example of communication in which the master node 10 transmits to the slave node 12 output command data for setting output specifications for the slave node 12 to output signals from the I/O terminals, according to the embodiment. Drive target devices such as motors, LEDs and the like are connected to the I/O terminal of the slave node 12. When it is necessary to output drive signals from the slave node 12 to these drive target devices, the master node 10 transmits output command data to the slave node 12. When detecting occurrence of an event by the master node 10 or a button input from the button switch 120, or the like, the master node 10 determines that output from the slave node 12 is necessary and transmits the output command data to the slave node 12. Alternatively, when receiving input notification data (see FIG. 16) from the slave node 12, the master node 10 may transmit the output command data to the slave node 12. When receiving the output command data, the slave node 12 sets output specifications according to the output command data and outputs signals according to the set specifications. The master node 10 may transmit the output command data not to a host network 124 via a network MCU 122, not to the slave node 12.

FIGS. 14A, 14B, 15A, and 15B show an example of the output command data of the I/O terminal which are transmitted from the master node 10 to the slave nodes 12 according to the embodiment. The output command data also includes the data common to all the I/O terminals and the data inherent to each of the I/O terminals.

The data common to all the I/O terminals are three data elements, i.e., data No. 1 through data No. 3. The data common to all the I/O terminals indicate setting items related to error processing common to each terminal. The data inherent to each of the I/O terminals are set in the slave node 12 by the data in the common part of the I/O setting data, and indicate the identification information of the pattern stored in the setting register 46.

Data No. 1 is a 4-bit (0.5-byte) communication error flag indicating communication error flags (8 types in total) of the data which the master node 10 last receives. The type of communication errors includes a CRC error, an error in the PID, and the like. If a communication error occurs, the master node retransmits only the common part of the output command data to the slave node 12.

Data No. 2 is a 1-bit (0.125-byte) abnormal state clear request to clear an abnormal state flag of the slave node 12. The slave node 12 enters an abnormal state when its temperature rises abnormally or its power source voltage drops. When detecting an abnormal state, the slave node 12 notifies the master node 10 of the abnormal state. After recovering from the abnormal state, the slave node 12 returns to a normal operation by receiving this request.

Since a sum of data No. 1 and data No. 2 is 5 bits (0.625 bytes) and the data are communicated in units of 1 byte, data No. 3 is provided as dummy data that is unused bits of 3 bits (0.375 bytes).

The data inherent to each of the I/O terminals are 9 data elements. The data inherent to the I/O terminal P00 are data No. 4 through data No. 8.

Data No. 4 is a 1-bit (0.125-byte) output possibility data specifying an on state (permitting output from the output terminal Dout or the PWM terminal)/off state of the data output of the I/O terminal P00. The master node 10 recognizes which drive target device is connected to the I/O terminal P00, and permits output when driving the drive target device.

Data No. 5 is 3-bit (0.375-byte) conducting time output pattern data that specifies possibility of the conducting time and the conducting time patterns (6 patterns in total) of the I/O terminal P00. The conducting time pattern selected from 6 patterns in total is set in the slave node 12 by data No. 2 in the common part of the I/O setting data, and is stored in the setting register 46.

Data No. 6 is 4-bit (0.5-byte) conducting time output count data that specifies the number of times (up to 16 times) of conducting time outputs of the I/O terminal P00.

The master node 10 specifies how long and how many times the I/O terminal P00 is conducted, using data No. 5 and data No. 6.

Data No. 7 is a 4-bit (0.5-byte) fade-in pattern setting data that specifies one of patterns (8 patterns in total) of the fade-in time of the I/O terminal P00. This setting is valid only when the terminal P00 is set to the PWM output terminal. The fade-in time pattern selected from 8 patterns in total is set in the slave node 12 by data No. 4 in the common part of the I/O setting data, and is stored in the setting register 46.

Data No. 8 is a 4-bit (0.5-byte) fade-out pattern setting data that specifies patterns (8 patterns in total) of the fade-out time of the I/O terminal P00. This setting is valid only when the terminal P00 is set to the PWM output terminal. The fade-out time pattern selected from 8 patterns in total is set in the slave node 12 by data No. 5 in the common part of the I/O setting data, and is stored in the setting register 46.

The master node 10 specifies how the PWM output of the I/O terminal P00 is subjected to fade-in/fade-out, using data No. 7 and data No. 8.

Data No. 9 is 2-bit (0.25-byte) PWM duty additional bit 1 data that specifies the resolution of the PWM output of the I/O terminal P00 (higher-order 2 bits in the case of 12 bits). When the duty of the PWM output of the I/O terminal P00 is 8 bits or bits, the slave node 12 ignores data No. 9.

Data No. 10 is 2-bit (0.25-byte) PWM duty additional bit 2 data that specifies the duty of the PWM output of the I/O terminal P00 (higher-order 2 bits in the case of 10 bits). When the duty of the PWM output of the I/O terminal P00 is 8 bits, the slave node 12 ignores data No. 10.

Data No. 11 is provided as dummy data which is unused bits of 4 bits (0.5 bytes) such that the sum of data No. 4 through data No. 11 forms the data in byte units.

Data No. 12 is a 1-byte (8-bit) PWM duty data that specifies the duty of the PWM output of the I/O terminal P00. When the duty of the PWM output of the I/O terminal P00 is 12 bits, the slave node 12 adds the data of No. 10 and No. 9 to the higher order of the data No. 12 to set the duty of the PWM output to 12 bits. When the duty of the PWM output of the I/O terminal P00 is 10 bits, the slave node 12 adds the data of No. 10 to the higher order of the data No. 12 to set the duty of the PWM output to 10 bits. When the duty of the PWM output of the I/O terminal P00 is 8 bits, the slave node 12 sets the duty of the PWM output to 8 bits, based on the data of No. 12.

The data inherent to the I/O terminal P01 are data No. 13 to data No. 21. The inherent data are also communicated for other I/O terminals.

Data No. 13 is the output possibility data similar to data No. 4. Data No. 14 is the conducting time output pattern data similar to data No. 5. Data No. 15 is the conducting time output count data similar to data No. 6. Data No. 16 is the fade-in pattern setting data similar to data No. 7. Data No. 17 is the fade-out pattern setting data similar to data No. 8. Data No. 18 is the PWM duty additional bit 1 data similar to data No. 9. Data No. 19 is the PWM duty additional bit 2 data similar to data No. 10. Data No. 20 is the dummy data similar to data No. 11. Data No. 21 is the PWM duty data similar to data No. 12.

When receiving the output command data, the slave node 12 sets output specifications of the I/O terminal according to the output command data, and outputs signals according to the set specifications.

Even if the number of I/O terminals increases, increase in the data amount of the output command data is suppressed and efficient data communication is realized by classifying the output command data into the data common to all the terminals and the data inherent to each of the terminals similarly to the I/O setting data. In addition, the master node 10 can make a flexible response corresponding to the number of I/O terminals, which facilitates I/O settings for slave nodes 12 with various numbers of terminals, even if the slave nodes 12 with different numbers of terminals exist together in the communication system.

Figure 16:
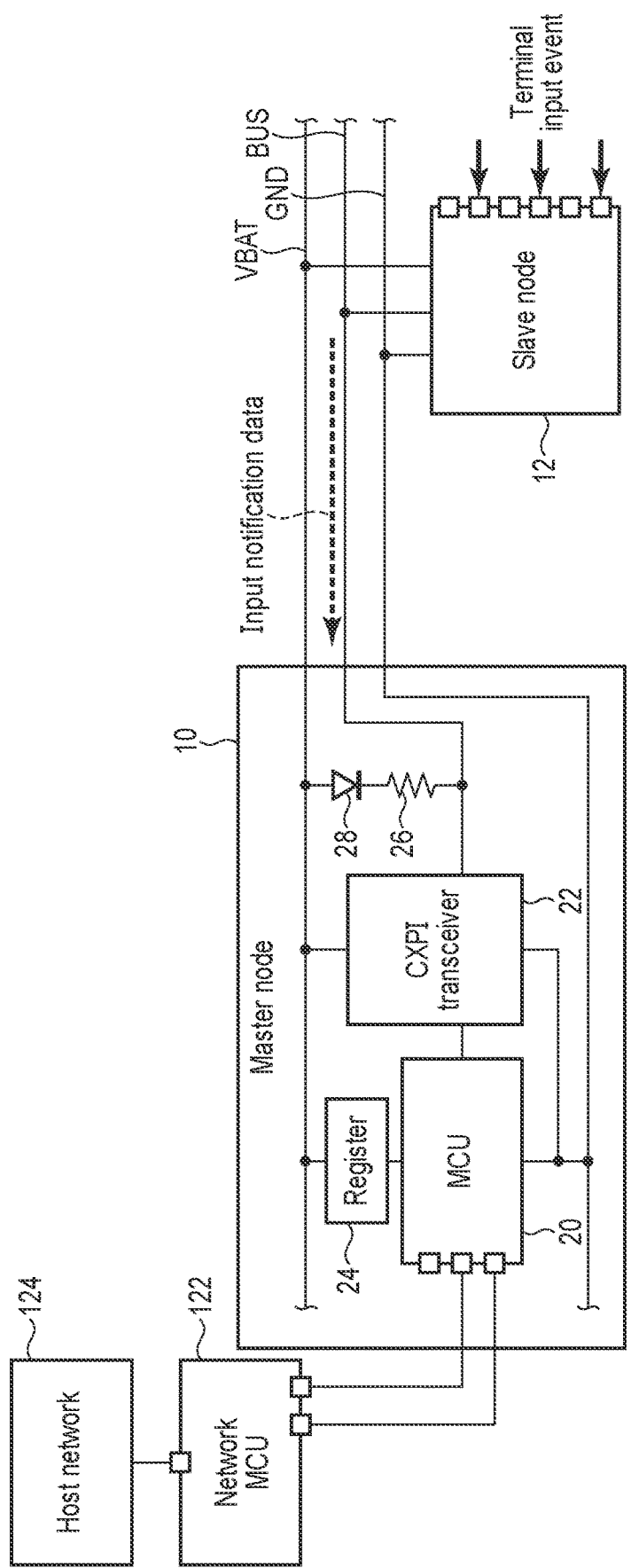
FIG. 16 is a block diagram showing an example of communication according to the embodiment.

FIG. 16 is a block diagram showing an example of communication in which the slave node 12 transmits the input notification data to the master node 10 when the slave node 12 input occurs, according to the embodiment. When input devices such as a potentiometer, a sensor, and the like are connected to the I/O terminal of the slave node 12 and events of terminal input of the slave node 12 occur from these input devices, input notification data is transmitted. Since the communication of the output command data shown in FIG. 13 and the communication of the input notification data shown in FIG. 16 are started due to user operations and occurrence of events, order of the transmission is not determined. The input notification data notify the master node 10 of the data input to the slave node 12 in accordance with the input specifications of the slave node 12.

FIGS. 17A and 17B show an example of the input notification data of the I/O terminal, which is transmitted from the slave node 12 to the master node 10, according to the embodiment. The input notification data also includes the data common to all the I/O terminals and the data inherent to each of the I/O terminals.

The data common to all the I/O terminals are three data elements, i.e., data No. 1 through data No. 3. The data common to all the I/O terminals indicates setting items related to error processing common to each terminal. The data inherent to each of the I/O terminals is set in the slave node 12 by the data in the common part of the I/O setting data, and indicates the identification information of the pattern stored in the setting register 46.

An analog signal from the input device is input to the CXPI driver/receiver 34 via the ADC circuit 50. Since the resolution of the ADC circuit 50 is different for each slave node 12, the slave nodes 12 transmit the input notification data in a common frame to the master node 10 irrespective of the resolution of the ADC circuit 50.

Data No. 1 is a 4-bit (0.5-byte) communication error flag indicating communication error flags (9 types in total) of the data which the slave node last receives.

Data No. 2 is a 2-bit (0.25-byte) abnormal state flag indicating a flag for notification of an abnormal state of the slave node 12.

Since a sum of data No. 1 and data No. 2 is 6 bits (0.75 bytes) and the data are communicated in units of 1 byte, data No. 3 is provided as dummy data that is unused bits of 2 bits (0.25 bytes).

Data inherent to each I/O terminal are 5 data elements. The data inherent to the I/O terminal P00 are data No. 4 through data No. 8.

Data No. 4 is a 0.125-byte (1-bit) input possibility data specifying an on state (Din in the on state)/off state of the data input of the I/O terminal P00.

Data No. 5 is 2-bit (0.25-byte) ADC input additional bit 1 data indicating a value input from the ADC circuit 50 of the I/O terminal P00 (higher-order 2 bits in a case where the resolution of the ADC circuit 50 is 12 bits). When the resolution of the ADC circuit 50 is 8 bits or 10 bits, the master node 10 ignores data No. 5.

Data No. 6 is 2-bit (0.25-byte) ADC input additional bit 2 data indicating a value input from the ADC circuit 50 of the I/O terminal P00 (higher-order 2 bits in a case where the resolution of the ADC circuit 50 is 10 bits). When the resolution of the ADC circuit 50 is 8 bits, the master node 10 ignores data No. 6.

Data No. 7 is provided as dummy data which is unused bits of 3 bits (0.375 bytes) such that the sum of data No. 4 through data No. 7 forms the data in byte units.

Data No. 8 is 1-bit (8-byte) ADC input indicating a value input from the ADC circuit 50 of the I/O terminal P00. When the resolution of the ADC circuit 50 is 12 bits, the master node 10 receives 12-bit data by adding data No. 5 and No. 6 to the higher-order data of No. 8. When the resolution of the ADC circuit 50 is bits, the master node 10 receives 10-bit data by adding data No. 6 to the higher-order data of No. 8. When the resolution of the ADC circuit 50 is 8 bits, the master node 10 receives 8-bit data, based on data No. 8.

Data inherent to the I/O terminal P01 are data No. 9 through data No. 13. The inherent data are also communicated for other I/O terminals.

Data No. 9 is the input possibility data similar to data No. 4. Data No. 10 is additional bit 1 data of the input of the ADC circuit 50 similar to data No. 5. Data No. 11 is additional bit 2 data of the input of the ADC circuit 50 similar to data No. 6. Data No. 12 is the dummy data similar to data No. 7. Data No. 13 is input data of the ADC circuit 50 similar to data No. 8.

When receiving the input notification data, the master node 10 interprets the input specification of the I/O terminal (resolution of the ADC circuit 50 in this case) based on the input notification data, and receives signals under the interpreted specifications.

Figure 18:
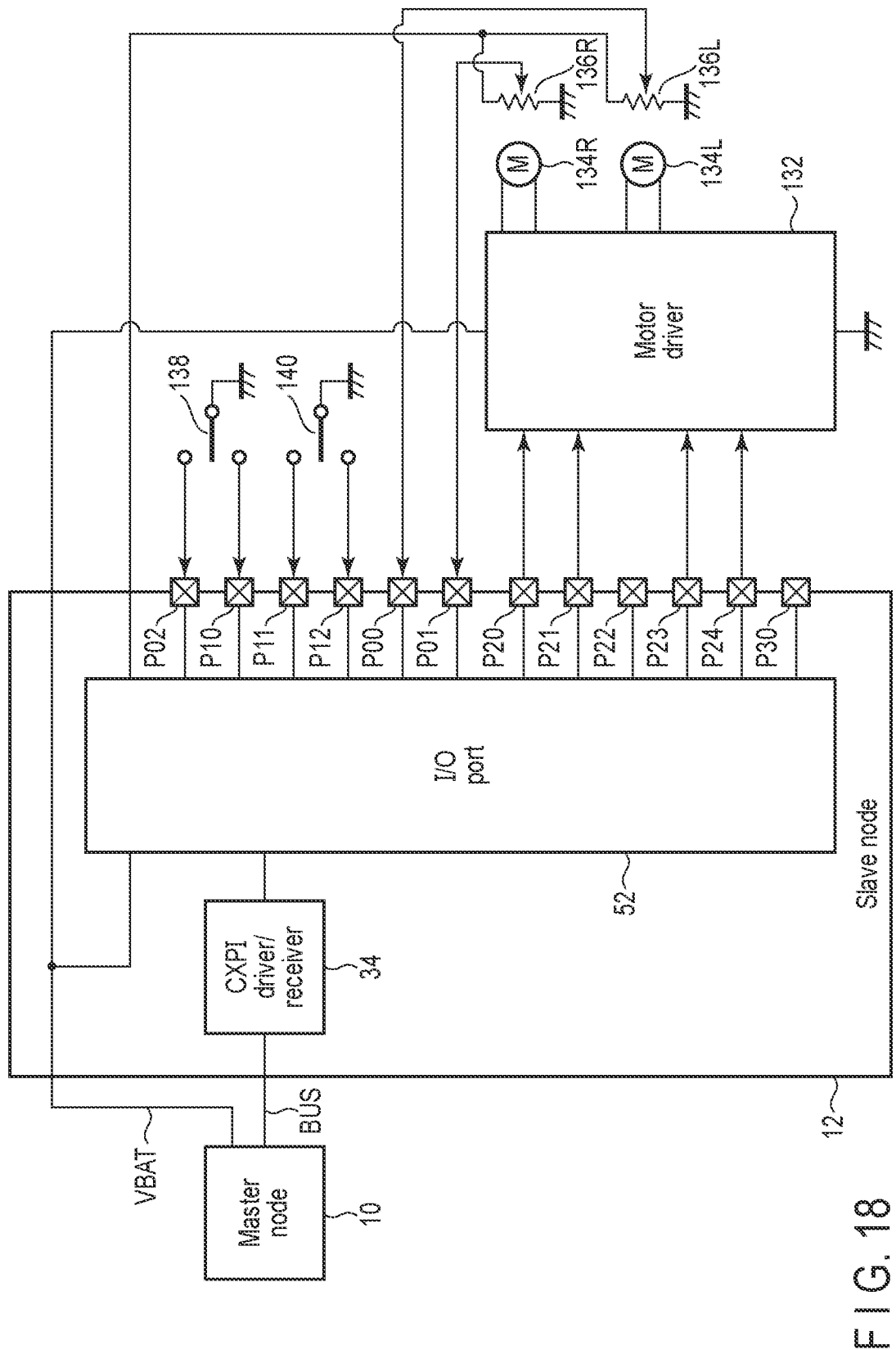
FIG. 18 is a block diagram showing another example of the slave node according to the embodiment.

FIG. 18 is a block diagram showing another example of the slave node 12 according to the embodiment. This slave node 12 is an example of driving side view mirror angle adjustment motors 134R and 134L via a multi-channel motor driver 132. Selector switches 138 and 140, which specify the angle adjustment direction of the side view mirrors in the vertical and horizontal directions, are connected to the I/O terminals P02, P10, P11, and P12.

When motor position adjustment information from the angle adjustment potentiometers 136R and 136L are input to the I/O terminals P00 and P01, the slave node 12 transmits the input notification data to the master node 10. The input notification data includes ADC input obtained by AD-converting the motor position adjustment information at a specified resolution. The master node 10 processes the input notification data to calculate the drive signals for motors 134R and 134L. The master node 10 transmits output command data including the drive signals to the slave node 12. The slave node 12 transmits the drive signals from the I/O terminals P20, P21, P23, and P24 to the motor driver 132. The drive signal includes the angle adjustment direction (vertical or horizontal direction) input from the selector switches 138 and 140. The motor driver 132 drives the drive motors 134R and 134L in response to the drive signals.

FIG. 19 shows another example of the slave node 12 according to the embodiment. This slave node 12 is an example of driving a side view mirror storing motor 146 via a high current motor driver 142. A selector switch 154 which specifies right side view mirror store/return, and a selector switch 156 which specifies left side view mirror store/return are connected to the I/O terminals P02, P10, P11, and P12.

When mirror store/return instruction information is input from the selector switches 154 and 156 to the I/O terminals P02, P10, P11, and P12, the slave node 12 transmits the input notification data to the master node 10. The input notification data includes the mirror store/return instruction information. The master node 10 processes the input notification data and calculates the drive signal for the motor 146. The master node 10 transmits output command data including the drive signal to the slave node 12. The slave node 12 outputs the drive signals from the I/O terminals P20, P21, P23, and P24 to the motor driver 142. The motor driver 142 drives the motor 146 in accordance with the drive signals.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A transmitter device configured to:
   transmit setting data to a receiver device including a plurality of terminals, wherein
   the setting data comprises first data and second data,
   the first data is common to the plurality of terminals and indicates set value candidates of an input function or an output function of each of the plurality of terminals, and
   the second data includes, with respect to each of the plurality of terminals, first inherent data indicating that the terminal is to be used as an input terminal or an output terminal and indicating an identifier of one of the set value candidates to be applied to the terminal;
   transmit output command data to the receiver device, wherein
   the output command data comprises third data and fourth data,
   the third data is common to the plurality of terminals and indicates an error process, and the fourth data includes, with respect to each of terminals to be used as the output terminal, second inherent data indicating an identifier of one of the set value candidates of the output function to be applied to the terminal; and receive notification data from the receiver device, wherein
the notification data comprises fifth data and sixth data,
the fifth data is common to the plurality of terminals and indicates an error process, and
the sixth data includes, with respect to each of terminals to be used as the input terminal, third inherent data indicating an identifier of one of the set value candidates of the input function to be applied to the terminal.

2. The transmitter device of claim 1, wherein
the transmitter device is configured to transmit the first data and then transmit the second data.

3. The transmitter device of claim 1, wherein
the transmitter device is configured to transmit the third data and then transmit the fourth data.

4. A receiver device including a plurality of terminals, wherein
the receiver device is configured to receive setting data from a transmitter device,
the setting data comprises first data and second data,
the first data is common to the plurality of terminals and indicates set value candidates of an input function or an output function of each of the plurality of terminals, and
the second data includes, with respect to, each of the plurality of terminals, first inherent data indicating that each of the plurality of terminals is to be used as an input terminal or an output terminal and indicating an identifier of one of the set value candidates to be applied to the terminal,
the receiver device is configured to receive output command data from the transmitter device,
the output command data comprises third data and fourth data,
the third data is common to the plurality of terminals and indicates an error process, and
the fourth data includes, with respect to, each of terminals to be used as the output terminal, second inherent data indicating an identifier of one of the set value candidates of the output function to be applied to the terminal, and
the receiver device is configured to transmit to the transmitter device notification data,
the notification data comprises fifth data and sixth data,
the fifth data is common to the plurality of terminals and indicates an error process, and
the sixth data includes, with respect to each of terminals to be used as the input terminal, third inherent data indicating an identifier of one of the set value candidates of the input function to be applied to the terminal.

5. The receiver device of claim 4, wherein
the receiver device is configured to receive the first data and then receive the second data.

6. The receiver device of claim 4, wherein
the receiver device is configured to receive the third data and then receive the fourth data.

7. The receiver device of claim 4, wherein
the receiver device is configured to receive the fifth data and then receives the sixth data.

8. A transmitting method comprising:
transmitting to a receiver device including a plurality of terminals setting data, wherein
the setting data comprises first data and second data,
the first data is common to the plurality of terminals and indicates set value candidates of an input function or an output function of each of the plurality of terminals, and
the second data includes, with respect to each of the plurality of terminals, first inherent data indicating that each of the plurality of terminals is to be used as an input terminal or an output terminal and indicating an identifier of one of the set value candidates to be applied to the terminal;
transmitting output command data to the receiver device, wherein
the output command data comprises third data and fourth data,
the third data is common to the plurality of terminals and indicates an error process, and
the fourth data includes, with respect to each of terminals to be used as the output terminal, second inherent data indicating an identifier of one of the set value candidates of the output function to be applied to the terminal; and
receiving notification data from the receiver device, wherein
the notification data comprises fifth data and sixth data,
the fifth data is common to the plurality of terminals and indicates an error process, and
the sixth data includes, with respect to each of terminals to be used as the input terminal, third inherent data indicating an identifier of one of the set value candidates of the input function to be applied to the terminal.

9. A receiving method of a receiver device including a plurality of terminals, the method comprising:
receiving from a transmitter device setting data, wherein
the setting data comprises first data and second data,
the first data is common to the plurality of terminals and indicates set value candidates an input function or an output function of each of the plurality of terminals, and
the second data includes, with respect to each of the plurality of terminals, first inherent data indicating that each of the plurality of terminals is to be used as an input terminal or an output terminal and indicating an identifier of one of the set value candidates to be applied to the terminal;
receiving output command data from the transmitter device, wherein
the output command data comprises third data and fourth data,
the third data is common to the plurality of terminals and indicates an error process, and
the fourth data includes, with respect to each of terminals to be used as the output terminal, second inherent data indicating an identifier of one of the set value candidates of the output function to be applied to the terminal; and
transmitting to the transmitter device notification data, wherein
the notification data comprises fifth data and sixth data,
the fifth data is common to the plurality of terminals and indicates an error process, and
the sixth data includes, with respect to each of terminals to be used as the input terminal, third inherent data indicating an identifier of one of the set value candidates of the input function to be applied to the terminal.

10. The transmitter device of claim 1, wherein the transmitter device is configured to receive communication data from the receiver device based on the notification data.

* * * * *